(12) United States Patent
Hanafusa (10) Patent No.: US 11,333,583 B2
(45) Date of Patent: May 17, 2022

(54) SAMPLE EXTRACTION TOOL

(71) Applicant: SHIMADZU CORPORATION, Kyoto (JP)

(72) Inventor: Nobuhiro Hanafusa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 337 days.

(21) Appl. No.: 16/407,302

(22) Filed: May 9, 2019

(65) Prior Publication Data

US 2019/0368977 A1 Dec. 5, 2019

(30) Foreign Application Priority Data

May 29, 2018 (JP) .............................. JP2018-102355

(51) Int. Cl.
 *G01N 1/08* (2006.01)
 *G01N 1/28* (2006.01)

(52) U.S. Cl.
 CPC ............... *G01N 1/08* (2013.01); *G01N 1/286* (2013.01); *G01N 2001/288* (2013.01)

(58) Field of Classification Search
 CPC .... G01N 1/08; G01N 1/286; G01N 2001/288; B01L 2200/025; B01L 2200/027; B01L 2200/0605; B01L 2200/0621; B01L 2300/046; B01L 2400/0406; B01L 2400/0683; B01L 3/502715; B01L 3/508; B01L 3/563; B01L 3/502707
 USPC ........................................................ 422/527
 See application file for complete search history.

(56) References Cited

U.S. PATENT DOCUMENTS

| 2010/0124780 | A1* | 5/2010 | Larkin | A61B 10/0291 435/307.1 |
| 2011/0157580 | A1 | 6/2011 | Nogami et al. | |
| 2012/0282616 | A1* | 11/2012 | Zeijlstra | B01L 3/50 435/6.12 |

(Continued)

FOREIGN PATENT DOCUMENTS

| JP | 2010-060474 A | 3/2010 |
| JP | 2016-170079 A | 9/2016 |
| WO | 2016/009720 A1 | 1/2016 |

(Continued)

OTHER PUBLICATIONS

Extended European Search Report dated Jul. 26, 2019 issued by the European Patent Office in counterpart application No. 19171641.4.

(Continued)

*Primary Examiner* — Benjamin R Whatley
*Assistant Examiner* — Jacqueline Brazin
(74) *Attorney, Agent, or Firm* — Sughrue Mion, PLLC (57) ABSTRACT

An extraction portion which is a piece of a micro sampling chip is safely cut, and the cut extraction portion can be accommodated in a predetermined container without impairing quantitativeness of a sample.
A sample extraction tool comprises a through hole for cutting the extraction portion from the micro sampling chip by bending the micro sampling chip while inserting the extraction portion to the through hole, the sample extraction tool is configured to be attached to an upper portion of a container for accommodating the extraction portion in such a state that the through hole is disposed on an open upper surface of the container.

2 Claims, 8 Drawing Sheets

(56) References Cited

U.S. PATENT DOCUMENTS

2017/0120259 A1  5/2017  Takeuchi et al.
2017/0168027 A1  6/2017  Hanafusa et al.

FOREIGN PATENT DOCUMENTS

| WO | 2016/017042 A1 | 2/2016 | |
|---|---|---|---|
| WO | 2017122314 A1 | 7/2017 | |
| WO | WO-2017122314 A1 * | 7/2017 | ............... G01N 1/12 |

OTHER PUBLICATIONS

Communication dated Jun. 17, 2020, from the European Patent Office in application No. 19171641.
Notice of Reasons for Refusal dated Jun. 29, 2021 from the Japanese Patent Office in JP Application No. 2018-102355.

* cited by examiner

SAMPLE EXTRACTION TOOL

BACKGROUND OF THE INVENTION

1. Field of the Invention

The present invention relates to a sample extraction tool configured to cut, as an extraction portion, a piece of a micro sampling chip including a microchannel configured to hold a living body-derived sample, such as whole blood, serum, plasma, filter paper blood, or urine, as a sample.

2. Description of the Related Art

In performing quantitative analysis on a sample such as a sample of biological origin, processing of removing a specific component unnecessary for analysis from the sample of biological origin and extracting a necessary component as a sample, and drying/solidifying processing of concentrating or drying/solidifying an extracted sample, should be performed in some cases. Conventionally, various apparatuses, each serving as a preprocessing apparatus, which automatically performs the above-stated preprocessing have been proposed and implemented (for example, refer to Japanese Patent Application Laid-Open No. 2010-60474).

Japanese Patent Application Laid-Open No. 2010-60474, for example, discloses that a plurality of cartridges holding a separation agent for dipping a sample and separating a specific component from the sample are held by a common carrying mechanism, the cartridges are sequentially placed in a pressure applying mechanism provided in a predetermined position by the carrying mechanism, and a pressure is applied to the cartridges in the pressure applying mechanism so that the sample is extracted. In this case, a plurality of extract receivers which receive extracts from the cartridges are moved relative to the cartridges below the cartridges by another carrying mechanism different from the carrying mechanism for the cartridges, to be sequentially placed in the pressure applying mechanism, so that extraction of the sample is successively performed.

However, in the above-described method, the carrying mechanisms for the cartridges and the extract receivers cannot be moved while extraction processing of a sample is performed in the pressure applying mechanism, so that there is a limit to what can be done for improving efficiency in preprocessing. Thus, the inventors of the present invention have proposed that a separation device having a filter for filtering a sample, and a collecting container configured to collect an extracted sample provided from the separation device are used as a set to carry this set in a random access manner to a port in which filtration processing, stirring processing or the like is performed, thereby improving efficiency in preprocessing (refer to WO2016/017042A1 and Japanese Patent Application Laid-Open No. 2016-170079).

SUMMARY OF THE INVENTION

Meanwhile, a micro sampling chip configured to collect a minute amount of sample has been proposed and implemented (refer to WO2016/009720A1). The micro sampling chip sucks a sample from a suction port using capillarity and holds the sample in a microchannel provided inside. In the micro sampling chip disclosed in WO2016/009720A1, a piece including a portion of the microchannel can be cut as an extraction portion by bending the micro sampling chip at a specific position of a device, whereby a certain amount of sample can be taken out with good reproducibility.

However, the capacity in the extraction portion is as minute as 5.6 µL, for example, and it is not easy to handle such a minute piece with fingers. In addition, it is conceivable that when or after the extraction portion is cut from the micro sampling chip, the sample adheres to fingers of an analyst. Furthermore, when the sample leaks from an end of the channel in the cut extraction portion, quantitativeness may be impaired.

It is therefore an object of the present invention to safely cut an extraction portion which is a piece of a micro sampling chip and to accommodate the cut extraction portion into a predetermined container without impairing quantitativeness of a sample.

The present invention targets a micro sampling chip which includes a microchannel for holding a sample and is configured to be able to cut a piece as an extraction portion, in which a portion of the sample held in the microchannel is held, in order to take out the portion of the sample as the sample to be extracted. In this invention, it is premised that the extraction portion cut from the micro sampling chip is accommodated in a predetermined container, the sample held in the extraction portion is taken out into the container using centrifugal force or the like, and various processings are applied to the sample taken out into the container. Thus, the sample extraction tool according to the present invention is configured so that the extraction portion of the micro sampling chip is cut from the micro sampling chip without touching the analyst's fingers, and the extraction portion cut from the micro sampling chip is accommodated directly in a predetermined container.

Specifically, the sample extraction tool according to the present invention comprises a through hole for cutting the extraction portion from the micro sampling chip by bending the micro sampling chip while inserting the extraction portion to the through hole, the sample extraction tool is configured to be attached to an upper portion of a container for accommodating the extraction portion in such a state that the through hole is disposed on an open upper surface of the container.

The sample extraction tool according to the present invention has, for example, a cap shape attached to the upper portion of the container so as to cover the upper portion of the container.

In the micro sampling chip to which the present invention is directed, for example, the microchannel includes a linear portion extending from the tip side to the base end side of the micro sampling chip, and a piece between a tip portion and a base end portion of the micro sampling chip is an extraction portion. It is necessary to cut the tip portion from the micro sampling chip before cutting the extraction portion from the micro sampling chip. Thus, in the present invention, the sample extraction tool may comprise a chip tip accommodating portion having an opening at its upper portion and including a space. The opening is for cutting the tip portion from the micro sampling chip by bending the micro sampling chip while fitting the tip portion of the micro sampling chip into the opening, the tip portion cut from the micro sampling chip is held in the space. Thus, the tip portion can be cut from the micro sampling chip without touching the analyst's fingers, and the cut tip portion can be held as it is by a chip tip portion.

The sample extraction tool according to the present invention comprises a through hole for cutting the extraction portion from the micro sampling chip by bending the micro sampling chip while inserting the extraction portion to the through hole, the sample extraction tool is configured to be attached to an upper portion of a container for accommodating the extraction portion in such a state that the through hole is disposed on an open upper surface of the container. Therefore, above the container for accommodating the extraction portion, the extraction portion can be cut from the micro sampling chip without touching fingers, and the cut extraction portion can be fallen directly in the container and accommodated.

DETAILED DESCRIPTION OF THE INVENTION

Hereinafter, an embodiment of a sample extraction tool will be described with reference to the drawings.

First, with reference to FIG. 3, a micro sampling chip 100 targeted by a sample extraction tool 1 of this embodiment will be described.

Figure 2:
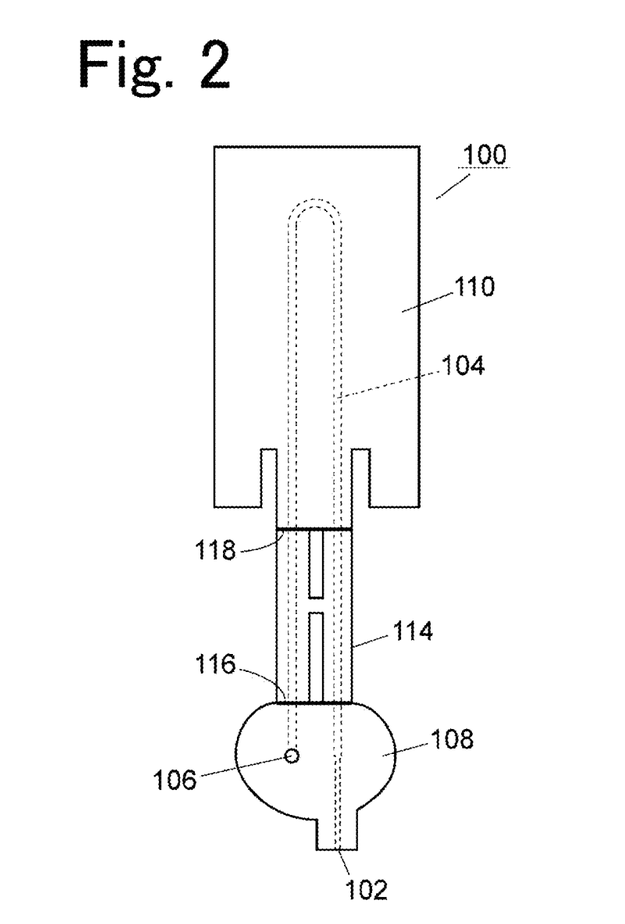
FIG. 2 is a plan view showing an example of a micro sampling chip targeted by the sample extraction tool of the same embodiment.

The micro sampling chip 100 has a suction port 102 for sucking a sample at its tip and includes a microchannel 104 configured to hold the sample sucked through the suction port 102. The microchannel 104 is a U-shaped flow path in which two linear portions extending from the tip side to the base end side of the micro sampling chip 100 are connected at a base end portion. One end of the microchannel 104 communicates with the suction port 102, and the other end communicates with an air vent hole 106.

The micro sampling chip 100 has two grooves 116 and 118 on its surface so as to be divided into three portions, a tip portion 108, a base end portion 110, and an extraction portion 114. The tip portion 108 and the extraction portion 114 can be cut from the micro sampling chip 100 by bending the micro sampling chip 100 at the positions of the grooves 116 and 118.

The extraction portion 114 includes a partial section of the microchannel 104. By cutting the extraction portion 114 from the micro sampling chip 100A, a certain amount of a sample held by the microchannel 104 can be taken out as a sample to be extracted.

The sample extraction tool 1 of this embodiment is configured to cut the extraction portion 114 from the micro sampling chip 100 without touching the analyst's fingers and to directly accommodate the cut extraction portion 114 in a predetermined container. In this embodiment, as a container for accommodating the extraction portion 114 cut from the micro sampling chip 100, a separation device 200 (see FIG. 3A) configured to extract a component to be analyzed in a sample can be used.

Figure 1A:
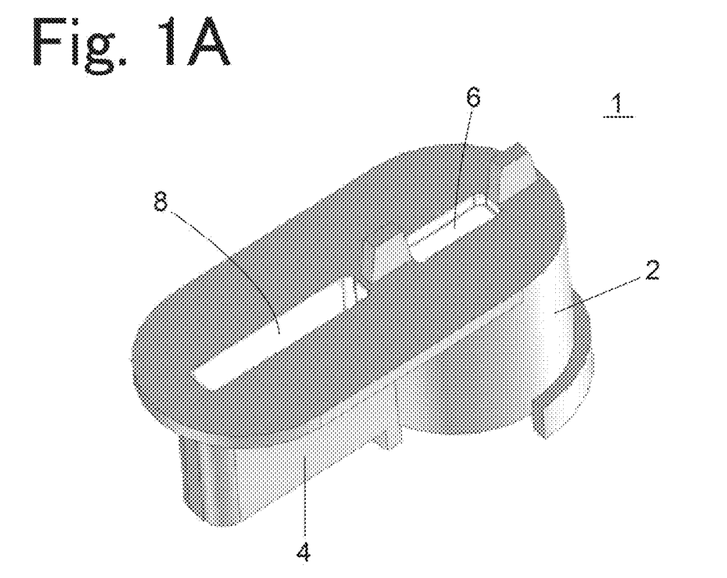
FIG. 1A is a perspective view as seen obliquely from above an embodiment of a sample extraction tool.
Figure 1B:
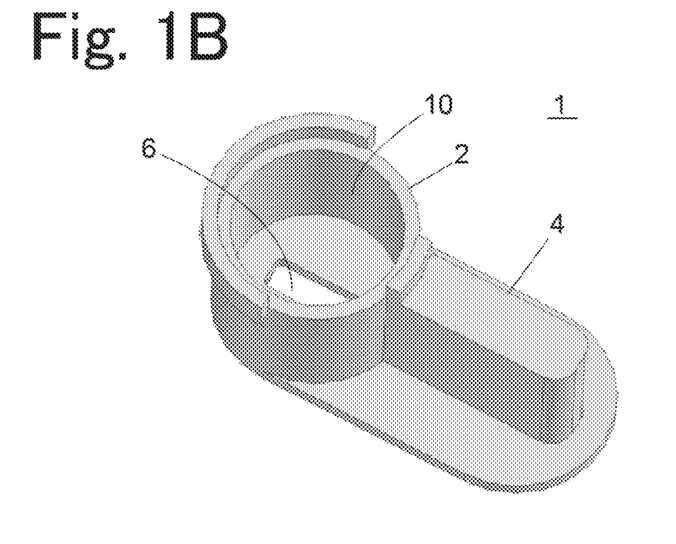
FIG. 1B is a perspective view as seen obliquely from below the same embodiment.

As shown in FIGS. 1 and 2, the sample extraction tool 1 includes a cap portion 2, which is attached to an upper portion of the separation device 200 so as to cover an open upper surface 204 (see FIG. 3A) of the separation device 200, and a chip tip accommodating portion 4 connected to a side of the cap portion 2.

The cap portion 2 has a cavity portion 10 whose lower portion is opened so as to accommodate an upper end portion of the separation device 200. The cap portion 2 is provided with a through hole 6 through which the extraction portion 114 of the micro sampling chip 100 is inserted from the side opposite to the opening of the cavity portion 10, and the micro sampling chip 100 is bent at the position of the groove 118 to cut the extraction portion 114.

The chip tip accommodating portion 4 comprises an opening 8 and a space 9. The opening 8 is for cutting the tip portion 108 from the micro sampling chip 100 by bending the micro sampling chip 100 at the position of the groove 116 while inserting the tip portion 108 to. The space 9 is for accommodating the tip portion 108 cut from the micro sampling chip 100.

Figure 3A:
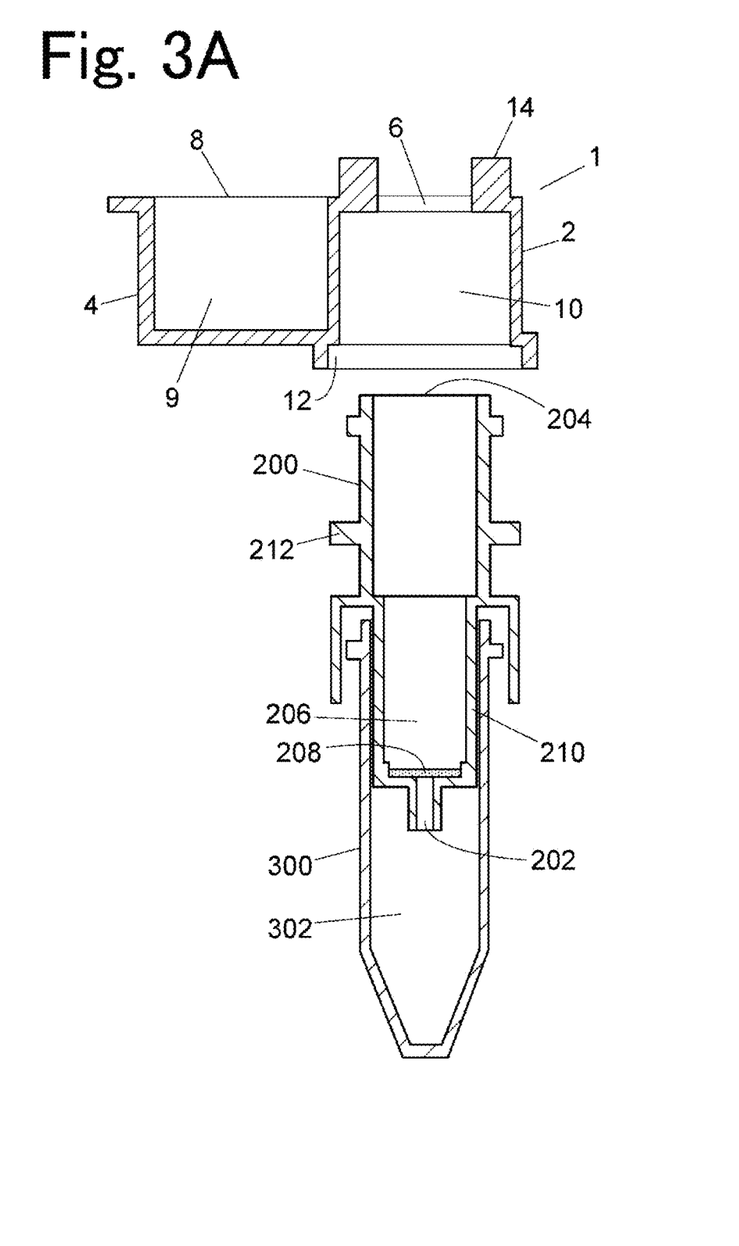
FIG. 3A is a cross-sectional view showing an example of a container targeted by the sample extraction tool of the same embodiment, together with the sample extraction tool.

As shown in FIG. 3A, in the separation device 200 for using the sample extraction tool 1, a lower end portion 210 is accommodated in the collecting container 300, and the separation device 200 constitutes a pair of preprocessing containers together with the collecting container 300. The separation device 200 has an extraction outlet 202 at the lower end and a separation membrane 208 at a bottom of an internal space 206, separates a sample accommodated in the internal space 206 by the separation membrane 208, and extracts a component to be analyzed into the internal space 302 of the collecting container 300 from the extraction outlet 202.

Figure 3B:
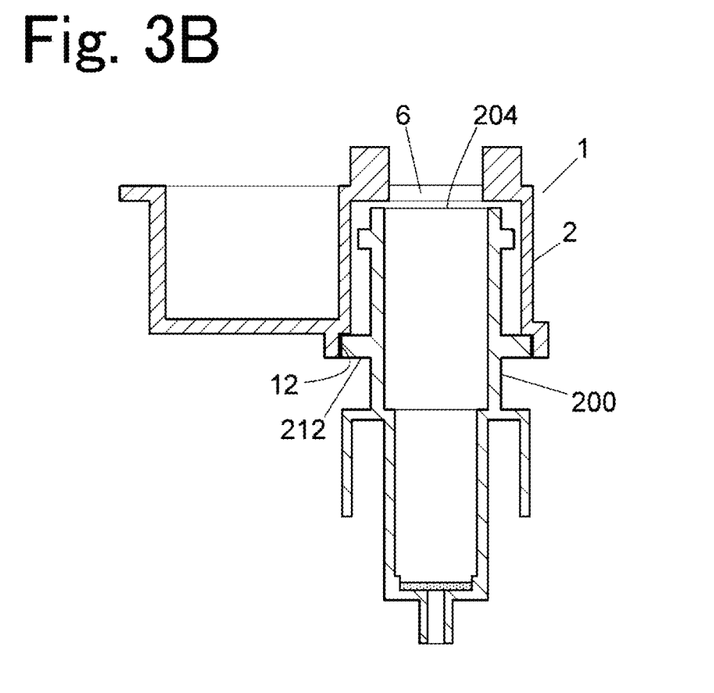
FIG. 3B is a cross-sectional view of a state in which the sample extraction tool of the same embodiment is attached to an upper portion of a separation device.

As shown in FIG. 3B, the sample extraction tool 1 is attached to the separation device 200 so that the cap portion 2 covers the upper portion of the separation device 200. A wide portion 12 fitted with a convex portion 212 provided on an outer peripheral surface of the separation device 200 is provided at a lower end portion of the cap portion 2 of the sample extraction tool 1. The position of the sample extraction tool 1 with respect to the separation device 200 is stabilized by fitting the wide portion 12 with the convex portion 212. The through hole 6 of the cap portion 2 is provided so as to come to a position right above the open upper surface 204 of the separation device 200 when the cap portion 2 is attached to the upper portion of the separation device 200.

Figure 4A:
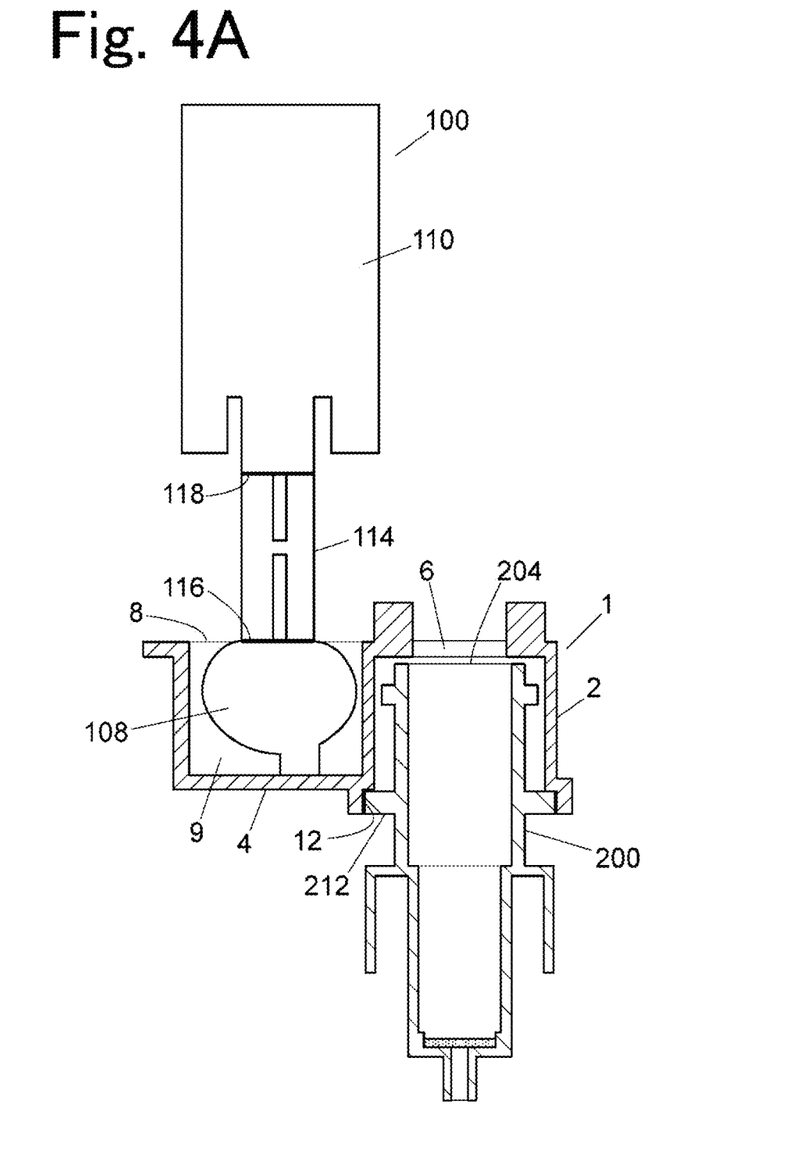
FIG. 4A is a view showing a state in which a tip portion is cut from the micro sampling chip using the sample extraction tool of the same embodiment.

When a sample sampled by the micro sampling chip 100 is accommodated in the separation device 200, first, as shown in FIG. 4A, the tip portion 108 of the micro sampling chip 100 is inserted to the innermost portion of the space 9 from the opening 8 of the chip tip accommodating portion 4 of the sample extraction tool 1, and the micro sampling chip 100 is snapped, whereby the tip portion 108 is cut from the micro sampling chip 100.

Figure 4B:
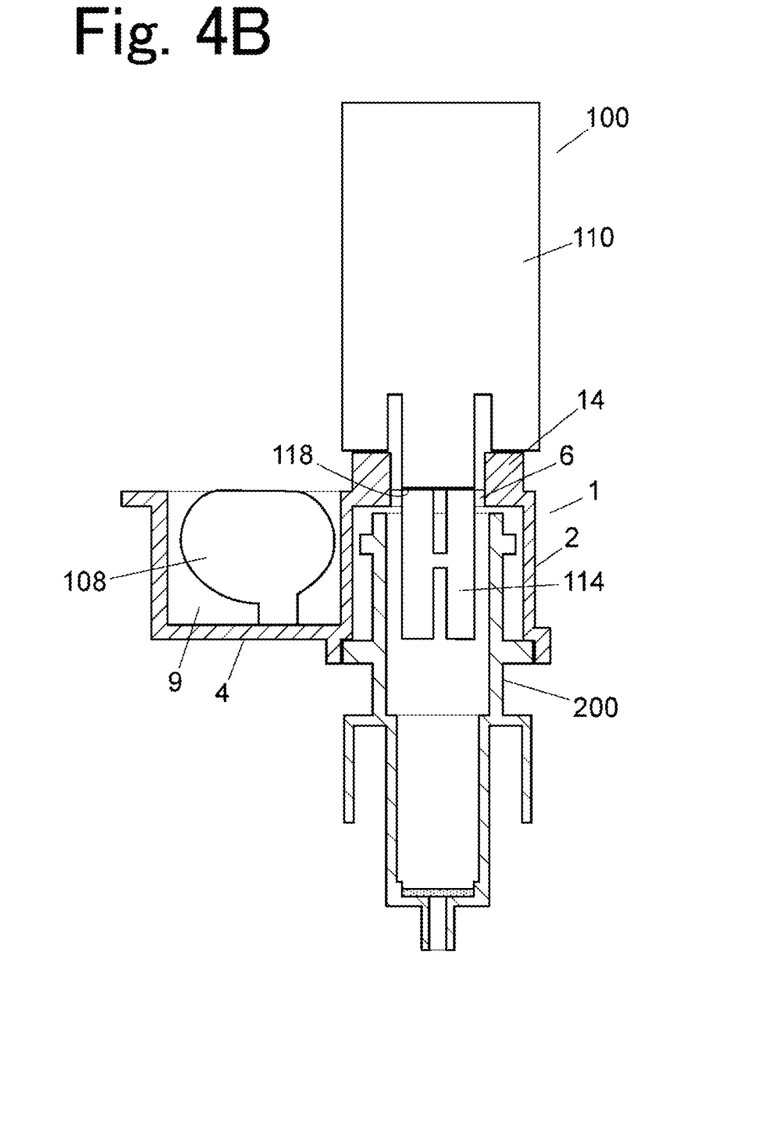
FIG. 4B is a view showing a state in which an extraction portion is cut from the micro sampling chip using the sample extraction tool of the same embodiment.

A depth dimension of the space 9 in the chip tip accommodating portion 4 of the sample extracting tool 1 is designed in such a way that, when the tip portion 108 of the micro sampling chip 100 is inserted to the innermost portion of the space 9 in the chip tip accommodating portion 4 of the sample extracting tool 1, an edge of the opening 8 comes to the position of the groove 116 of the micro sampling chip 100 or a position slightly closer to the tip portion than the position of the groove 116. As a result, the tip portion 108 of the micro sampling chip 100 is inserted to the innermost portion of the space 9 in the chip tip accommodating portion 4 of the sample extracting tool 1, and when the micro sampling chip 100 is snapped, the micro sampling chip 100 breaks at the position of the groove 116, so that the tip portion 108 is cut from the micro sampling chip 100. As shown in FIG. 4B, the tip portion 108 cut from the micro sampling chip 100 is held as it is in the space 9 in the chip tip accommodating portion 4.

The cutting of the tip portion 108 from the micro sampling chip 100 is not necessarily performed in a state in which the sample extraction tool 1 is attached to the upper portion of the separation device 200.

After the tip portion 108 is cut from the micro sampling chip 100, as shown in FIG. 4B, the extraction portion 114 of the micro sampling chip 100 is inserted into the through hole 6 of the sample extraction tool 1 attached to the upper portion of the separation device 200, and the micro sampling chip 100 is snapped, so that the extraction portion 114 is cut from the micro sampling chip 100.

Figure 4C:
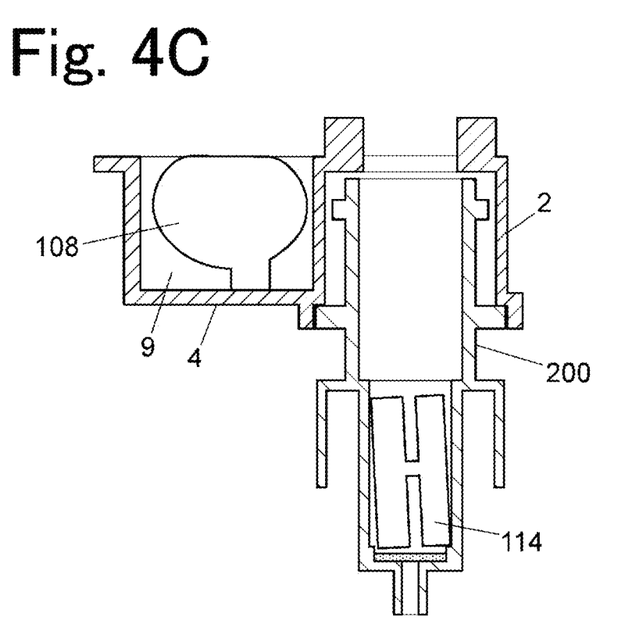
FIG. 4C is a view showing a state after the extraction portion is cut from the micro sampling chip.

The sample extraction tool 1 is provided with a protruding portion 14 which abuts against the base end portion 110 of the micro sampling chip 100 when the extraction portion 114 of the micro sampling chip 100 is inserted into the through hole 6. Designing is made in such a way that, when the base end portion 110 of the micro sampling chip 100 abuts against the protruding portion 14 of the sample extraction tool 1, an edge of the through hole 6 comes to the position of the groove 118 or a position closer to the tip portion than the position of the groove 118. As a result, the extraction portion 114 of the micro sampling chip 100 is inserted into the through hole 6, and when the micro sampling chip 100 is snapped, the micro sampling chip 100 breaks at the position of the groove 118, so that the extraction portion 114 is cut from the micro sampling chip 100. As shown in FIG. 4C, the extraction portion 114 cut from the micro sampling chip 100 falls as it is and is accommodated in the separation device 200.

A sample in the extraction portion 114 accommodated in the separation device 200 is taken out into the separation device 200 from the extraction portion 14 by applying processing such as shaking to the separation device 200 thereafter.

Figure 5:
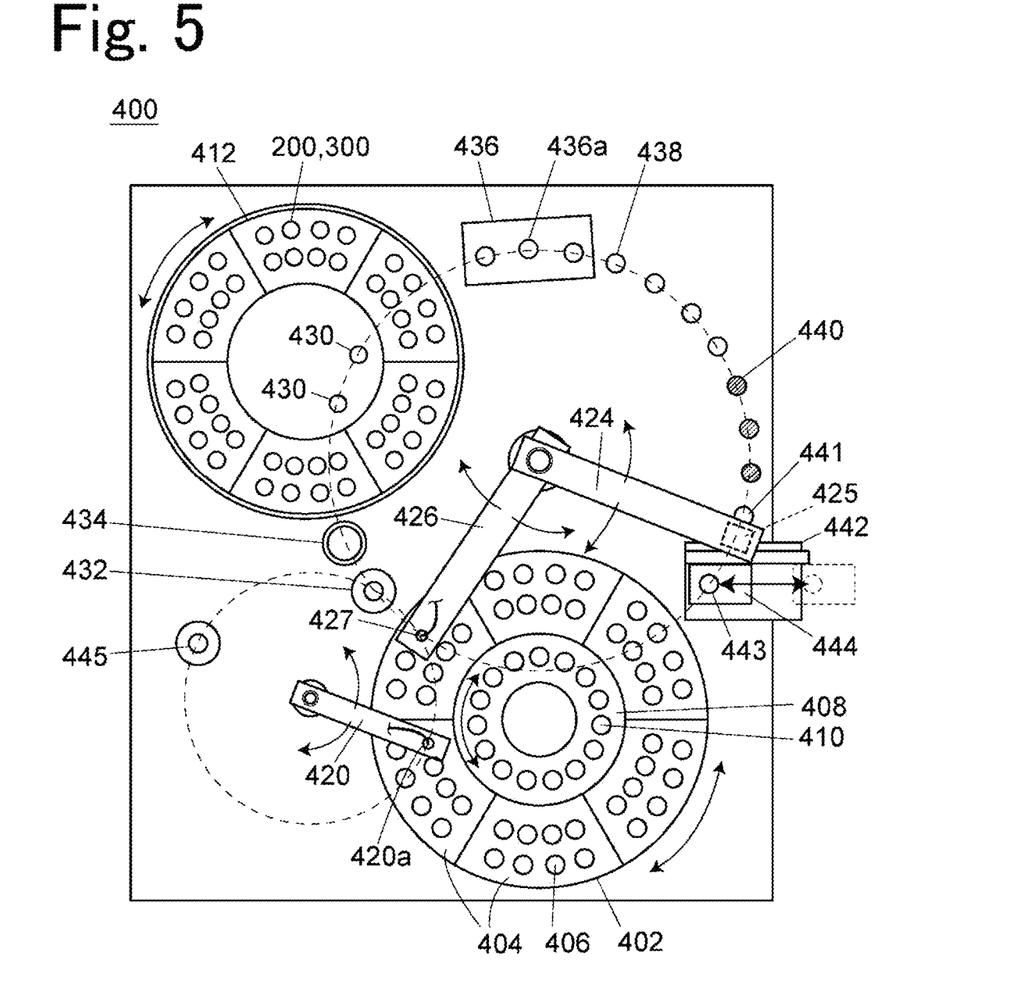
FIG. 5 is a plan view schematically showing an example of a preprocessing apparatus using a preprocessing container including the separation device and a collecting container.

An example of a preprocessing apparatus which reprocesses a sample in the extraction portion 114 cut from the micro sampling chip 100 will be described with reference to FIG. 5.

A preprocessing apparatus 400 executes a necessary preprocessing item by using one set of preprocessing containers each including a set of the separation device 200 and the collecting container 300, for each sample. In the preprocessing apparatus 400, a plurality of processing ports for executing respective preprocessing items are provided, and a preprocessing container accommodating a sample is set in any of the processing ports so that a preprocessing item corresponding to the processing port is executed on the sample accommodated in the preprocessing container.

The separation device 200 and the collecting container 300 are carried by a carrying arm 424. The carrying arm 424 includes a holding portion 425 for holding the separation device 200 and the collecting container 300 on a tip side, and rotates in a horizontal plane in such a manner that the holding portion 425 makes an arc-shaped track. All the processing ports and other ports to which the separation device 200 and the collecting container 300 are to be carried are provided along the arc-shaped track made by the holding portion 425.

A sample setting portion 402 for setting sample containers 406 each accommodating a sample is provided, and a sampling arm 420 is provided near the sample setting portion 402. The sampling arm 420 is used for taking a sample from a sample container set in the sample setting portion 402. In the sample setting portion 402, sample racks 404 which hold the plurality of sample containers 406 are annularly arranged.

The sampling arm 420 rotates in a horizontal plane and moves upward and downward in a vertical direction. A sampling nozzle 420a is held on a tip side of the sampling arm 420 in such a manner that a tip of the sampling nozzle 420a is oriented vertically downward.

A dispensation port 432 is provided in a position on the track of the sampling nozzle 420 a and on the track of the holding portion 425 of the carrying arm 424. The dispensation port 432 is a port where the sampling nozzle 420a dispenses a sample to the separation device 200 being unused. The separation device 200 being unused is set in the dispensation port 432 by the carrying arm 424.

On an inner side of the sample setting portion 402, a reagent setting portion 408 for setting a reagent container 410 is provided, and a reagent arm 426 for taking a reagent from the reagent container set in the reagent setting portion 408, is provided. The reagent arm 426 rotates and moves upward and downward in a horizontal plane. A probe 427 is provided at a tip portion of the reagent arm 426. A base end of the probe 427 is connected to a syringe pump which sucks and discharges liquid, and it is possible to suck and discharge a reagent from a tip of the probe 427.

The preprocessing container setting portion 412 is configured to allow a plurality of preprocessing containers each including a set of the separation device 200 and the collecting containers 300 which are unused and stacked, to be annularly arranged. The preprocessing container setting portion 412 rotates in a horizontal plane and moves the preprocessing containers circumferentially, to place a set in an arbitrary preprocessing container in a position along the track of the holding portion 425 of the carrying arm 424. The carrying arm 424 can hold the separation device 200 or the collecting container 300 which is unused and placed in a position along the track of the holding portion 425.

The separation device 200 accommodating the extraction portion 114 cut from the micro sampling chip 100 is set in the preprocessing container setting portion 412 together with the collecting container 300 which is paired with the separation device 200. When setting the separation device 200 accommodating the extraction portion 114 in the preprocessing container setting portion 412, an analyzer inputs a position in the preprocessing container setting portion 412 where the separation device 200 is set and information on a sample held in the extraction portion 114, and registers the position and the information in the apparatus. When the information on the sample held in the extraction portion 114 and the position are registered in the apparatus, the preprocessing apparatus 400 carries the separation device 200 and the collecting container 300 to a shaking portion 436, and shakes the separation device 200 to take out the sample in the extraction portion 114 into the separation device 200.

In the preprocessing apparatus 400, as ports of a preprocessing portion each of which accommodates a preprocessing container and is used for executing a specific preprocessing item, filtration ports 430, stirring ports 436a, a temperature adjustment port 438 for the separation device 200, a temperature adjustment port 440 for the collecting container 300, and a dilution port 441 are provided.

The filtration port 430 is configured to filter a sample while applying a negative pressure to a preprocessing container set in the filtration port 430. The shaking portion 436 serves to take out the sample from the extraction portion 114 and agitate a sample solution in the separation device 200. Each of the temperature adjustment ports 438 and 440 accommodates the separation device 200 or the collecting container 300 and adjusts a temperature of the separation device 200 or the collecting container 300 at a certain temperature.

The preprocessing apparatus 400 further includes a sample transfer apparatus 442 for transferring as a sample a component, which is extracted to be in the collecting container 300 by filtration in the filtration port 430, to a sample injecting apparatus (such as an automatic sampler, for example) placed adjacent to the preprocessing apparatus 400, at a lateral edge on a casing side. The sample transfer apparatus 442 includes a moving portion 444 which is caused to move along one line in a horizontal plane by a driving mechanism including a rack-and-pinion mechanism. A transfer port 443 for setting the collecting container 300 accommodating a sample is provided in an upper surface of the moving portion 444.

The preprocessing apparatus 400 includes a disposal port 434 for disposing of the separation device 200 and the collecting container 300 which are once used, in a position along a track of the holding portion 425 of the carrying arm 424 near the dispensation port 432. Further, the preprocessing apparatus 400 includes a cleaning port 445 for cleaning the sampling nozzle 420a in a position along a track of the sampling nozzle 420a.

What is claimed is:

1. A system comprising:
   a container, a sample extraction tool; and a micro sampling chip, wherein
   the micro sampling chip includes a microchannel for holding a sample and is configured to be cut into a piece as an extraction portion, in which a portion of the sample held in the microchannel is held, in order to take out the portion of the sample as the sample to be extracted, the microchannel further includes a linear portion extending from a tip side to a base end side of the micro sampling chip, the extraction portion is a piece between a tip portion and a base end portion of the micro sampling chip,
   the container includes an open upper surface and an inner space for accommodating the extraction portion,
   the sample extraction tool comprises a chip tip accommodating portion and a through hole, the chip tip accommodating portion has a space and an opening provided above the space, the sample extraction tool is attached to an upper portion of the container such that the through hole is disposed on an open upper surface of the container and leads to the inner space of the container, the through hole and the opening are provided at an upper surface of the sample extraction tool, and the sample extraction tool is configured so that the space of the chip tip accommodating portion is disposed outside of the inner space of the container,
   the tip portion of the micro sampling chip fits into the opening and is accommodated in the space, the opening cuts the tip portion from the other portion of the micro sampling chip by bending the micro sampling chip while the tip portion is fit into the opening, and the tip portion that has been cut from the other portions of the micro sampling chip is held in the space, and
   after the tip portion that has been cut from the other portions of the micro sampling chip, the extraction portion of the micro sampling chip is inserted to the through hole, and the through hole cuts the extraction portion from the micro sampling chip by bending the micro sampling chip.

2. The system according to claim 1, wherein the sample extraction tool further comprises a cap shape attached to the upper portion of the container so as to cover the upper portion of the container.

* * * * *